(12) United States Patent
Bakas et al.

(10) Patent No.: US 12,113,449 B2
(45) Date of Patent: Oct. 8, 2024

(54) TRANSFORMER ARRANGEMENT

(71) Applicant: HITACHI ENERGY LTD, Zürich (CH)

(72) Inventors: Panagiotis Bakas, Västerås (SE); Roberto Alves, Västerås (SE); Jan Svensson, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/553,045

(22) PCT Filed: Mar. 30, 2022

(86) PCT No.: PCT/EP2022/058504
§ 371 (c)(1),
(2) Date: Sep. 28, 2023

(87) PCT Pub. No.: WO2022/207761
PCT Pub. Date: Oct. 6, 2022

(65) Prior Publication Data
US 2024/0204679 A1    Jun. 20, 2024

(30) Foreign Application Priority Data

Mar. 31, 2021   (EP) ..................................... 21166436

(51) Int. Cl.
*H02M 5/257* (2006.01)
*H02M 1/34* (2007.01)

(52) U.S. Cl.
CPC ........... *H02M 5/257* (2013.01); *H02M 1/348* (2021.05)

(58) Field of Classification Search
CPC ............ H02M 5/00; H02M 5/02; H02M 5/04; H02M 5/06; H02M 5/10–18; H02M 5/20;
(Continued)

(56) References Cited

U.S. PATENT DOCUMENTS 4,621,222 A  * 11/1986 Kahkipuro ................ B66B 1/30
                                                             318/146
8,519,682 B2    8/2013 Oates et al.
(Continued)

FOREIGN PATENT DOCUMENTS

CN         102308461 A       1/2012
CN         102736028 A      10/2012
(Continued)

OTHER PUBLICATIONS

International Preliminary Report on Patentability, International Application No. PCT/EP2022/058504, mailed Jul. 19, 2023, 16 pages.
(Continued)

*Primary Examiner* — Thienvu V Tran
*Assistant Examiner* — Carlos O Rivera-Perez
(74) *Attorney, Agent, or Firm* — Sage Patent Group

(57) ABSTRACT

A transformer arrangement comprising a transformer having a primary side for receiving input voltage and current from a source and a secondary side for providing output voltage and current to a load. The transformer arrangement further comprises an AC-AC PE converter connected to a thyristor used for bypassing the AC-AC PE converter in case of a short-circuit fault in a terminal of the primary side and/or the secondary side. The transformer arrangement further comprises a thyristor-based AC-AC PE converter connected to a thyristor-tapped winding. The AC-AC PE converter is connected with the thyristor-tapped winding via the thyristor-based AC-AC PE converter. The thyristor-based AC-AC PE converter is connected to an impedance to protect the thyristor-tapped winding from short-circuit faults of the thyristor-based AC-AC PE converter.

12 Claims, 14 Drawing Sheets

(58) Field of Classification Search

CPC .......... H02M 5/22; H02M 5/225; H02M 5/25; H02M 5/253; H02M 5/257; H02M 5/27; H02M 5/271; H02M 5/275; H02M 5/29; H02M 5/293; H02M 5/297; H02M 5/40; H02M 5/42; H02M 5/443; H02M 5/447; H02M 5/45; H02M 5/453; H02M 5/458; H02M 5/4585; H02M 1/00; H02M 1/0064; H02M 1/0067; H02M 1/007; H02M 1/06; H02M 1/065; H02M 1/32; H02M 1/34–348; H01F 29/00; H01F 29/02; H01F 29/025; H01F 29/04; H01F 29/08; H01F 29/10; H01F 29/12; H01F 29/14; H01F 29/143; H01F 29/146; H02J 3/00; H02J 3/36; H02J 3/38; H02J 3/46

USPC ....... 363/34, 35, 50–58, 64, 65, 95, 96, 123, 363/131, 135–140; 323/212, 213, 215, 323/216, 247–264, 271, 276, 351, 323/355–363; 361/35–41, 93.1–102

See application file for complete search history.

(56) References Cited

U.S. PATENT DOCUMENTS

| | | | |
|---|---|---|---|
| 9,281,756 B2 | 3/2016 | Divan et al. | |
| 9,325,171 B2 | 4/2016 | Divan et al. | |
| 9,331,476 B2 * | 5/2016 | Tekletsadik | ............ H02H 9/021 |
| 2006/0039171 A1 | 2/2006 | Lavieville et al. | |
| 2010/0201338 A1 | 8/2010 | Haj-Maharsi et al. | |
| 2010/0220499 A1 | 9/2010 | Haj-Maharsi et al. | |
| 2016/0195891 A1 | 7/2016 | Divan et al. | |

FOREIGN PATENT DOCUMENTS

| | | |
|---|---|---|
| CN | 106057452 A | 10/2016 |
| CN | 208723556 U | 4/2019 |
| DE | 2534644 A1 | 2/1977 |
| JP | S53116450 A | 10/1978 |
| JP | S58147016 A | 9/1983 |
| JP | 2017117084 A | 6/2017 |
| JP | 2018064028 A | 4/2018 |
| KR | 1020050036666 A | 4/2005 |
| WO | 2016141949 A1 | 9/2016 |

OTHER PUBLICATIONS

International Search Report and Written Opinion, International Application No. PCT/EP2022/058504, mailed Jun. 28, 2022, 18 pages.

Yousef-Zai F Q, et al, "Solid-State On-Load Transformer Tap Changer", IEE Proceedings: Electric Power Applications, Institution of Electrical Engineers, GB, vol. 143, No. 6, XP006006415, Nov. 11, 1996, 11 pages.

Garcia S M, et al, "Feasibility of Electronic Tap-Changing Stabilizers for Medium Voltage Lines-Precedents and New Configurations", IEEE Transactions on Power Delivery, IEEE Service Center, New York, NY, vol. 24, No. 3, XP011269875, Jul. 1, 2009, 14 pages.

Chinese Office Action, Chinese Application No. 202280024624X, mailed Mar. 30, 2022, 8 pages.

Japanese Office Action and English Translation, Japanese Patent Application No. 2023-560401, mailed Apr. 9, 2024, 6 pages.

Korean Decision for Grant of Patent and English Summary, Korean Patent Application No. 10-2023-7033661, mailed Jul. 2, 2024, 6 pages.

Egoitz Martinez, et al., "Thyristor based solid state tap changer for distribution transformers", University of Mondragon Electronics and Computing Department, Arrasate-Mondragon, Spain, Jun. 24-26, 2013, 5 pages.

* cited by examiner

TRANSFORMER ARRANGEMENT

CROSS REFERENCE TO RELATED APPLICATIONS

This application is a 35 U.S.C. § 371 national stage application of PCT International PCT/EP2022/058504 filed on Mar. 30, 2022, which claims priority to European Patent Application 21166436.2, filed on Mar. 31, 2021, the disclosures and content of which are incorporated by reference herein in their entireties.

TECHNICAL FIELD

Embodiments herein relate to the field of transformers. In particular, embodiments herein relate to Power-Electronics-Enhanced-Transformers (PEETs).

BACKGROUND

A transformer is equipment used in an electric grid of a power network. Transformers transform voltage and current in order to transport and distribute electric energy. A Power Electronic (PE) converter uses power electronic components such as Insulated Gate Bipolar Transistors (IGBTs), to control and convert the electric power. The PE converter does not produce power, but rather transform/convert power, i.e., convert the power from a source, e.g., Alternating Current (AC) of one frequency, to the form of power required from a load, e.g., AC of another frequency or Direct current (DC).

Different topologies based on PE converters have been proposed to replace the mechanical On-Load-Tap-Changer (OLTC) of a conventional Voltage-Regulating Transformer (VRT). A simplified single-phase representation of the conventional solution that employs a mechanical OLTC for adding voltage-regulation functionality to a transformer is depicted in FIG. 1. PE converters can be used to achieve the voltage-regulation functionality, as in the conventional solution, but also to achieve additional functionalities not possible with the conventional solution, e.g., power flow control and phase-unbalance mitigation. Therefore, circuits that combine PE converters with transformers are termed PEETs. PEETs are thus circuits that utilize power electronics to add functionality, such as voltage regulation, power-flow control, phase-unbalance mitigation, etc, to a transformer.

US 20100201338 A1, US 2010220499 A1 and US 20160195891 A1 describe circuits that combine AC-AC PE converters with a transformer. The circuits are aimed primarily at achieving voltage regulation (stepped or stepless) and/or power flow control and employ an AC-AC PE converter that is rated for a fraction of the power and the voltage of the transformer. The AC-AC PE converter may be of two main types:

1. Indirect AC-AC PE converter, which comprises two DC-AC converters interconnected via a DC-link with energy storage elements, e.g., capacitors, batteries, or capacitors+Batteries; or
2. Direct AC-AC converter, which comprises four-quadrant switches that block voltage of both polarities and conduct current in both directions and does not employ a DC-link with energy storage elements.

Moreover, the AC-AC PE converter may be connected to the transformer in three different ways:

1. PE converter connected to a tapped auxiliary winding;
2. PE converter connected to a separate auxiliary winding; or
3. PE converter connected in series to one of the two windings.

The circuits proposed in the prior art described above feature many advantages compared to the conventional VRTs, like the one shown in FIG. 1. Some of these advantages are fast and stepless voltage regulation, possibility to mitigate voltage flickers, and possibility to achieve additional functionalities such as power-flow control, harmonic filtering, reactive-power compensation and phase-unbalance mitigation. However, the PE converters, typically constructed by IGBTs, feature higher cost and significantly higher losses than the mechanical OLTCs.

SUMMARY

It is an object of embodiments herein to reduce the cost and losses of the PE converters proposed in the prior-art.

According to an aspect the object is achieved by providing a transformer arrangement. The transformer arrangement comprises a transformer having a primary side for receiving input voltage and current from a source and a secondary side for providing output voltage and current to a load. The transformer arrangement further comprises an AC-AC PE converter connected to a thyristor used for bypassing the AC-AC PE converter in case of a short-circuit fault in a terminal of the primary side and/or the secondary side. The transformer arrangement further comprises a thyristor-based AC-AC PE converter connected to a thyristor-tapped winding. The AC-AC PE converter is connected with the thyristor-tapped winding via the thyristor-based AC-AC PE converter. The thyristor-based AC-AC PE converter is connected to an impedance to protect the thyristor-tapped winding from short-circuit faults of the thyristor-based AC-AC PE converter.

According to some embodiments the thyristor-based AC-AC PE converter comprises one or more parallel connected and/or series connected thyristors.

The current solution is based on the realisation that a part of the AC-AC PE converter can be replaced with a thyristor-based AC-AC converter as thyristors are cheaper and more efficient compared to IGBTs and other devices with turn-off functionality. Consequently, a transformer arrangement that reduces the cost and losses of the AC-AC PE converters, is achieved.

BRIEF DESCRIPTION OF THE FIGURES

Further technical features of the present disclosure will become apparent through the following description of one or several exemplary embodiments given with reference to the appended figures, where.

It should be noted that the drawings have not necessarily been drawn to scale and that the dimensions of certain elements may have been exaggerated for the sake of clarity.

DETAILED DESCRIPTION

As described above, embodiments herein aim at replacing part of the AC-AC PE converters with thyristor-based AC-AC converters. Compared to IGBTs and other devices with turn-off functionality, thyristors are cheaper and more efficient. Therefore, the object of the solution according to embodiments herein is to reduce the cost and losses of the PE converters proposed in the prior-art.

Figure 1:
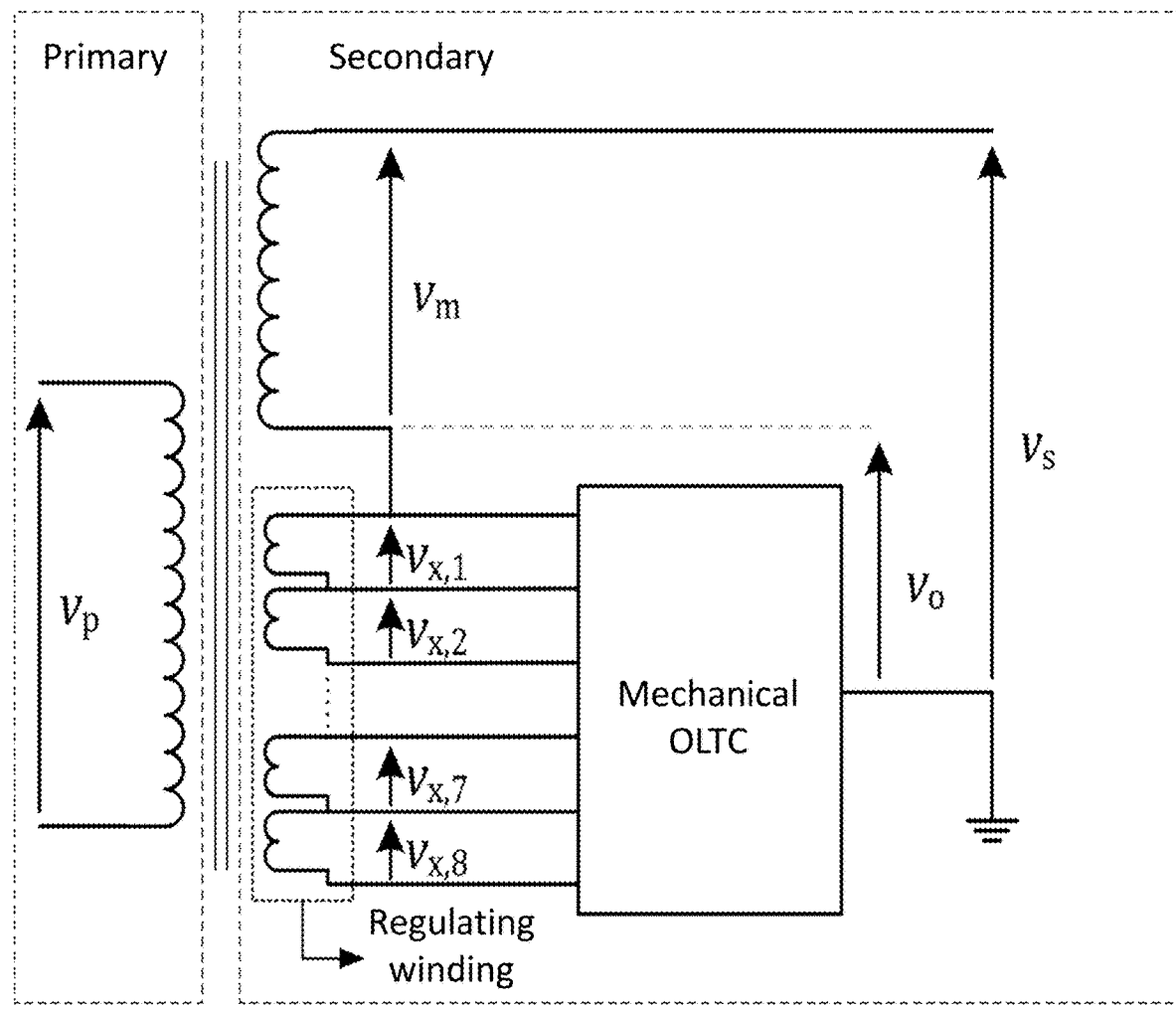
FIG. 1 is a schematic overview depicting a conventional voltage-regulating transformer employing a mechanical OLTC for achieving voltage-regulation functionality.
Figure 2A:
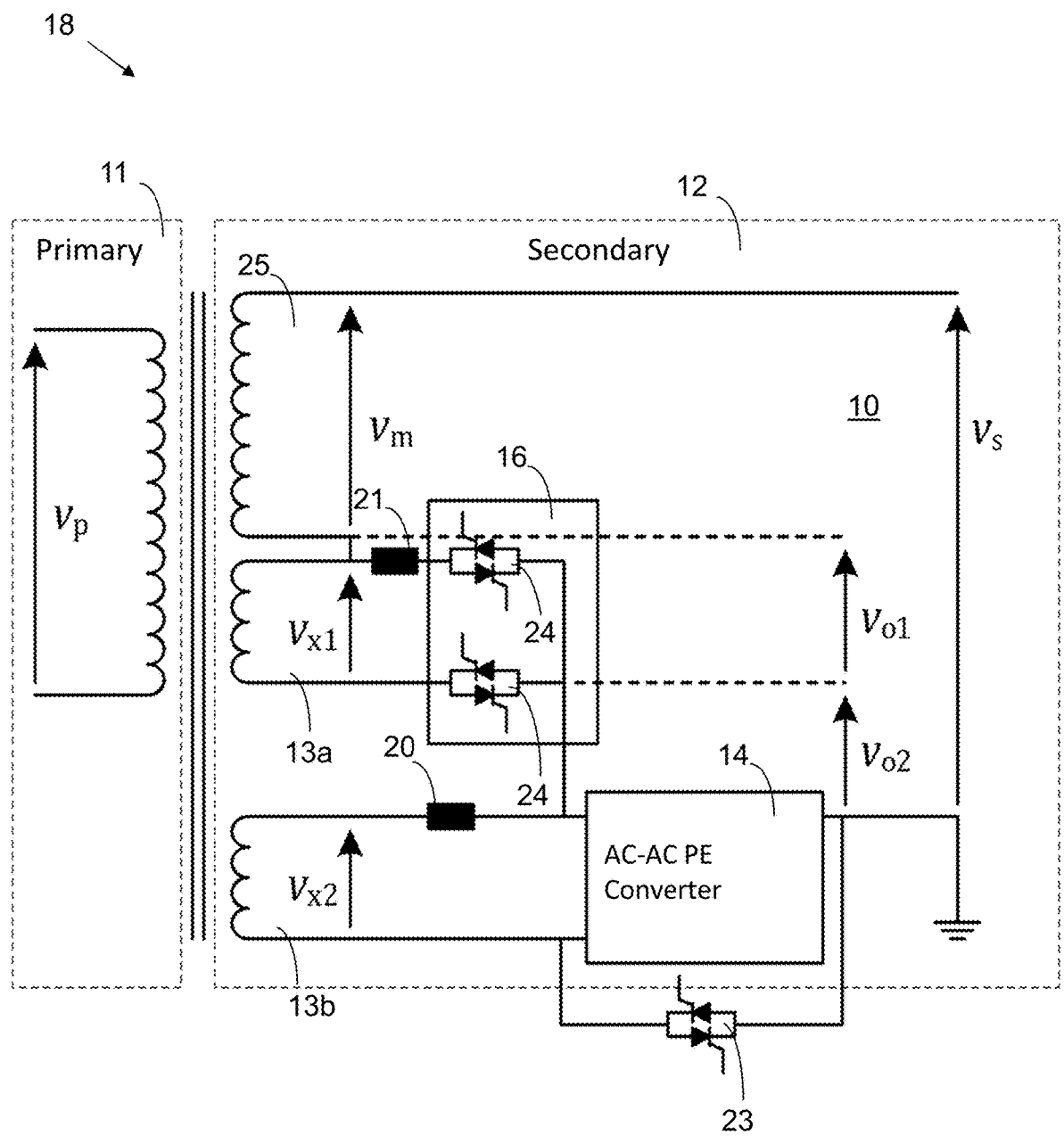
FIG. 2a is a schematic overview depicting a transformer arrangement with a tapped auxiliary winding according to embodiments herein.

FIG. 2a schematically illustrates a transformer arrangement 18 according to embodiments herein. The transformer arrangement 18 comprises a transformer 10. The transformer 10 has a primary side 11 for receiving input voltage and current from a source and a secondary side 12 for providing output voltage and current to a load. The transformer arrangement 18 further comprises an AC-AC PE converter 14 connected to a thyristor 23. The thyristor is used for bypassing the AC-AC PE converter 14 in case of a short-circuit fault in a terminal of the primary side 11 and/or the secondary side 12. The transformer arrangement 18 further comprises a thyristor-based AC-AC PE converter 16 connected to a thyristor-tapped winding 13a. The AC-AC PE converter 14 is augmented, i.e., connected, with the thyristor-tapped winding 13a via the thyristor-based AC-AC PE converter 16. The thyristor-tapped winding 13a may be connected, e.g., in series, at the input (left-hand-side terminal) of the AC-AC PE converter 14. The thyristor-based AC-AC PE converter 16 is connected to an impedance 21 to protect the thyristor-tapped winding 13a from short-circuit faults of the thyristor-based AC-AC PE converter 16. The impedance 21 may also be connected to the thyristor-tapped winding 13a. According to some embodiments the impedance 21 may be a single impedance connected either at a top or bottom terminal of the thyristor-tapped winding 13a. According to some embodiments the impedance 21 may be split in two parts, each of which is connected to top and bottom terminals of the thyristor-tapped winding 13a. According to some embodiments the impedance 21 may be a coupled impedance, wherein the coupled impedance is associated to high impedance along the path of a short-circuit fault of the thyristor-based AC-AC PE converter 16 and associated to low impedance for commutation between the thyristors 24. The impedance 21 connected to the thyristor-based AC-AC PE converter 16 will be described in further detail below with respect to FIGS. 6a-c.

According to some embodiments the thyristor-based AC-AC PE converter 16 comprises one or more parallel connected and/or series connected thyristors 24.

According to some embodiments the AC-AC PE converter 14 is connected to an auxiliary winding 13b. The auxiliary winding 13b may be tapped, as shown in FIG. 2a. That the auxiliary winding 13b is tapped means that it is connected in series to the secondary main winding 25 and, depending on the thyristor switching state, also to the thyristor-tapped winding 13a. Thus, the current that flows through the tapped auxiliary winding is of the same magnitude as that of the secondary main winding and the thyristor tapped winding.

According to some embodiments the AC-AC PE converter 14 is connected to an impedance 20 to protect the auxiliary winding 13b from a short-circuit fault of the AC-AC PE converter 14. The impedance 20 may also be connected to the auxiliary winding 13b. The impedance 20 connected to the AC-AC PE converter 14 and the impedance 21 connected to the thyristor-based AC-AC PE converter 16 do not necessarily need to have the same impedance value.

Figure 2B:
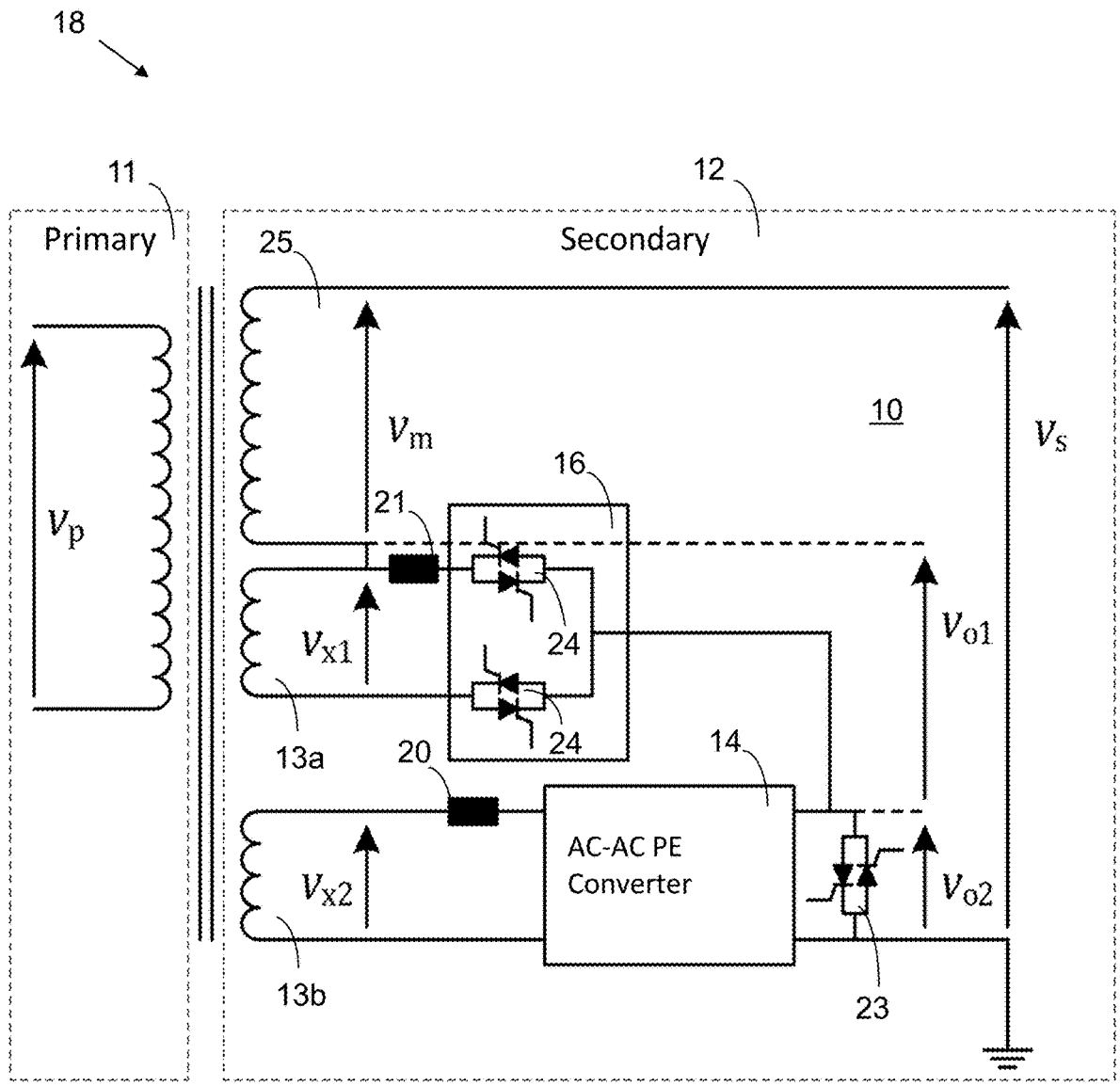
FIG. 2b is a schematic overview depicting a transformer arrangement with a separate auxiliary winding according to embodiments herein.

FIG. 2b schematically illustrates a transformer arrangement 18 according to embodiments herein. The transformer arrangement 18 comprises a transformer 10. The transformer 10 has a primary side 11 for receiving input voltage and current from a source and a secondary side 12 for providing output voltage and current to a load. The transformer arrangement 18 further comprises an AC-AC PE converter 14 connected to a thyristor 23. The thyristor is used for bypassing the AC-AC PE converter 14 in case of a short-circuit fault in a terminal of the primary side 11 and/or the secondary side 12. The transformer arrangement 18 further comprises a thyristor-based AC-AC PE converter 16 connected to a thyristor-tapped winding 13a. The AC-AC PE converter 14 is augmented, i.e., connected, with the thyristor-tapped winding 13a via the thyristor-based AC-AC PE converter 16. The thyristor-tapped winding 13a may be connected, e.g., in series, at the output (right-hand-side terminals) of the AC-AC PE converter. The thyristor-based AC-AC PE converter 16 is connected to an impedance 21 to protect the thyristor-tapped winding 13a from short-circuit faults of the thyristor-based AC-AC PE converter 16. The impedance 21 may also be connected to the thyristor-tapped winding 13a. According to some embodiments the impedance 21 may be a single impedance connected either at a top or bottom terminal of the thyristor-tapped winding 13a. According to some embodiments the impedance 21 may be split in two parts, each of which is connected to top and bottom terminals of the thyristor-tapped winding 13a. According to some embodiments the impedance 21 may be a coupled impedance, wherein the coupled impedance is associated to high impedance along the path of a short-circuit fault of the thyristor-based AC-AC PE converter 16 and associated to low impedance for commutation between the thyristors 24. The impedance 21 connected to the thyristor-based AC-AC PE converter 16 will be described in further detail below with respect to FIGS. 6a-c.

According to some embodiments the thyristor-based AC-AC PE converter 16 comprises one or more parallel connected and/or series connected thyristors 24.

According to some embodiments the AC-AC PE converter 14 is connected to an auxiliary winding 13b. The auxiliary winding 13b may be separate, as shown in FIG. 2b. That the auxiliary winding 13b is separate means that it is not directly connected to the secondary main winding 25 or to the thyristor-tapped winding 13a, but through the AC-AC PE converter 14. Thus, the current of the auxiliary winding 13b does not need to be of the same magnitude as that of the main winding 25 and the thyristor-tapped winding 13a. This means that the design of the separate auxiliary winding 13b is more flexible than that of the thyristor-tapped auxiliary winding 13a.

According to some embodiments the AC-AC PE converter 14 is connected to an impedance 20 to protect the auxiliary winding 13b from a short-circuit fault of the AC-AC PE converter 14. The impedance 20 may also be connected to the auxiliary winding 13b. The impedance 20 connected to the AC-AC PE converter 14 and the impedance 21 connected to the thyristor-based AC-AC PE converter 16 do not necessarily need to have the same impedance value.

Figure 2C:
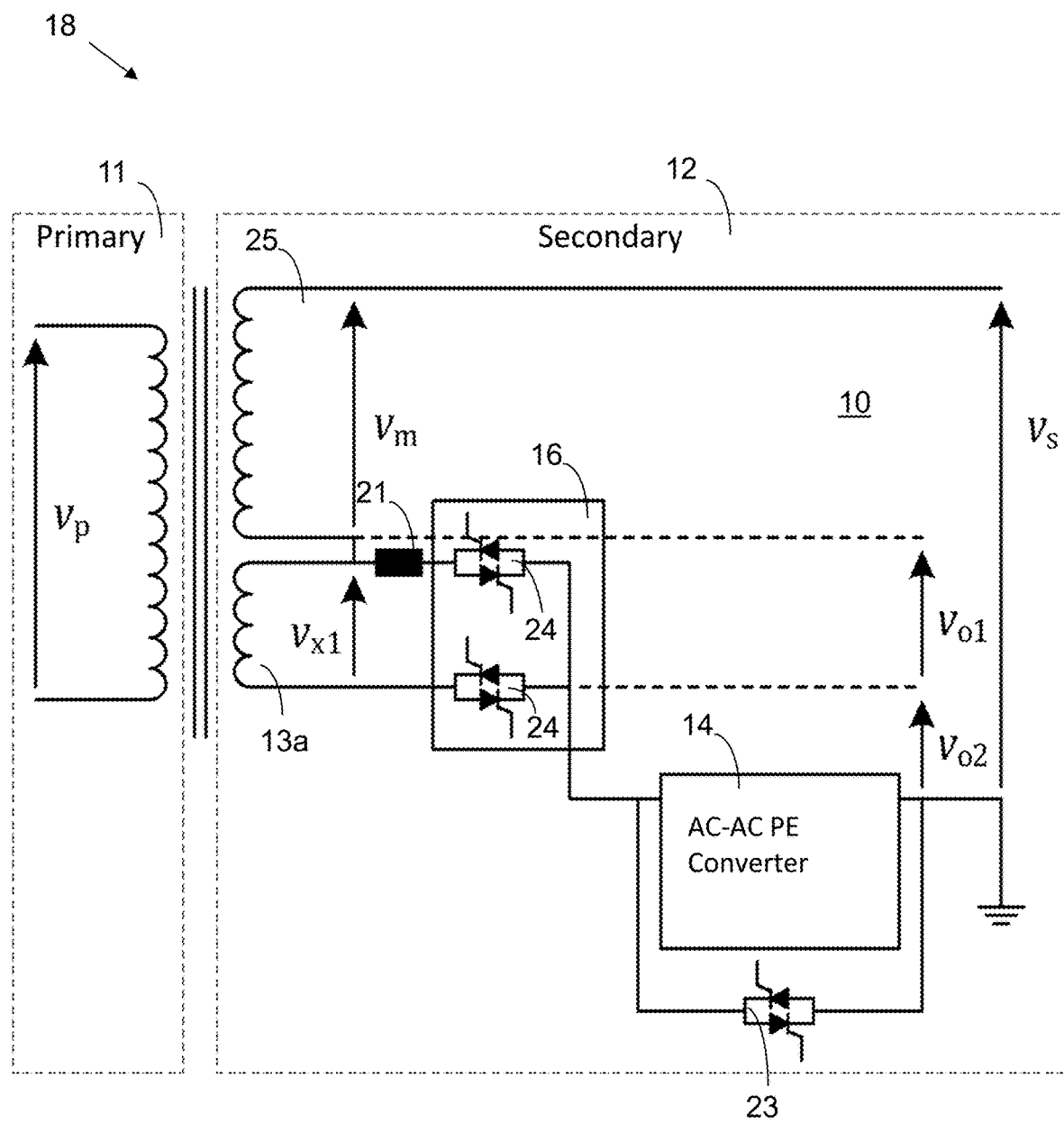
FIG. 2c is a schematic overview depicting a transformer arrangement with an AC-AC PE converter connected in series with a thyristor-tapped winding according to embodiments herein.

FIG. 2c schematically illustrates a transformer arrangement 18 according to some embodiments herein. The transformer arrangement 18 comprises a transformer 10. The transformer 10 has a primary side 11 for receiving input voltage and current from a source and a secondary side 12 for providing output voltage and current to a load. The transformer arrangement 18 further comprises an AC-AC Power Electronic (PE) converter 14 connected to a thyristor 23. The thyristor is used for bypassing the AC-AC PE converter 14 in case of a short-circuit fault in a terminal of the primary side 11 and/or the secondary side 12. The transformer arrangement 18 further comprises a thyristor-based AC-AC PE converter 16 connected to a thyristor-tapped winding 13a. The AC-AC PE converter 14 is augmented, i.e., connected, with the thyristor-tapped winding 13a via the thyristor-based AC-AC PE converter 16. The AC-AC PE converter 14 may be connected in series with the thyristor-tapped winding 13a. In some embodiments the AC-AC PE converter 14 is connected in series to the main winding 25, and not connected to the thyristor-tapped winding 13a or any auxiliary winding. The thyristor-based AC-AC PE converter 16 is connected to an impedance 21 to protect the thyristor-tapped winding 13a from short-circuit faults of the thyristor-based AC-AC PE converter 16. The thyristor-based AC-AC PE converter 16 may comprise one or more parallel connected and/or series connected thyristors 24.

FIGS. 2a, 2b and 2c thus show circuits that have been augmented with one or more thyristor-based AC-AC PE converter 16. For the thyristor-based AC-AC PE converter 16 the instantaneous output voltage is given by:

$$vs = vm + vo1 + vo2, \quad \text{a)}$$

where vm is the instantaneous voltage of the main winding 25, vo1 is the instantaneous voltage generated by the thyristor-based AC-AC PE converter 16 and vo2 is the instantaneous voltage generated by the AC-AC PE converter 14. The regulation of vs is realized by controlling vo1 and vo2. For the prior-art circuits, shown in US 20100201338 A1, US 2010220499 A1 and US 20160195891 A1, the instantaneous output voltage vs is given by:

$$vs = vm + vo, \quad \text{b)}$$

where vm is the instantaneous voltage of the main winding 25 and vo the instantaneous voltage generated by a PE converter. The regulation of vs is realized by controlling vo. From a) and b) above it becomes evident that, for a certain regulation range ±ΔV, the following apply:

The PE converters of prior-art, which generate vo, must be rated for providing the full regulation range ±ΔV;

The AC-AC PE converter 14 of FIGS. 2a, 2b and 2c, which generate vo2, must be rated for providing a fraction of the regulation range+ΔV, as the thyristor-based AC-AC PE converter 16 contribute to the voltage regulation by generating vo1. Yet, the voltage rating of the AC-AC PE converter 14 and the thyristor-based AC-AC PE converter 16 should be sufficient for providing the full regulation range ±ΔV.

In terms of current rating, the thyristor-based AC-AC PE converter 16 may be rated for the same current as the thyristor 23. In this way, the thyristor-based AC-AC PE converter 16 does not require extra overcurrent protection against short circuits in the secondary side 12 and/or primary side 11 and thyristor losses are lower compared to thyristors that are rated for the nominal current.

Figure 3A:
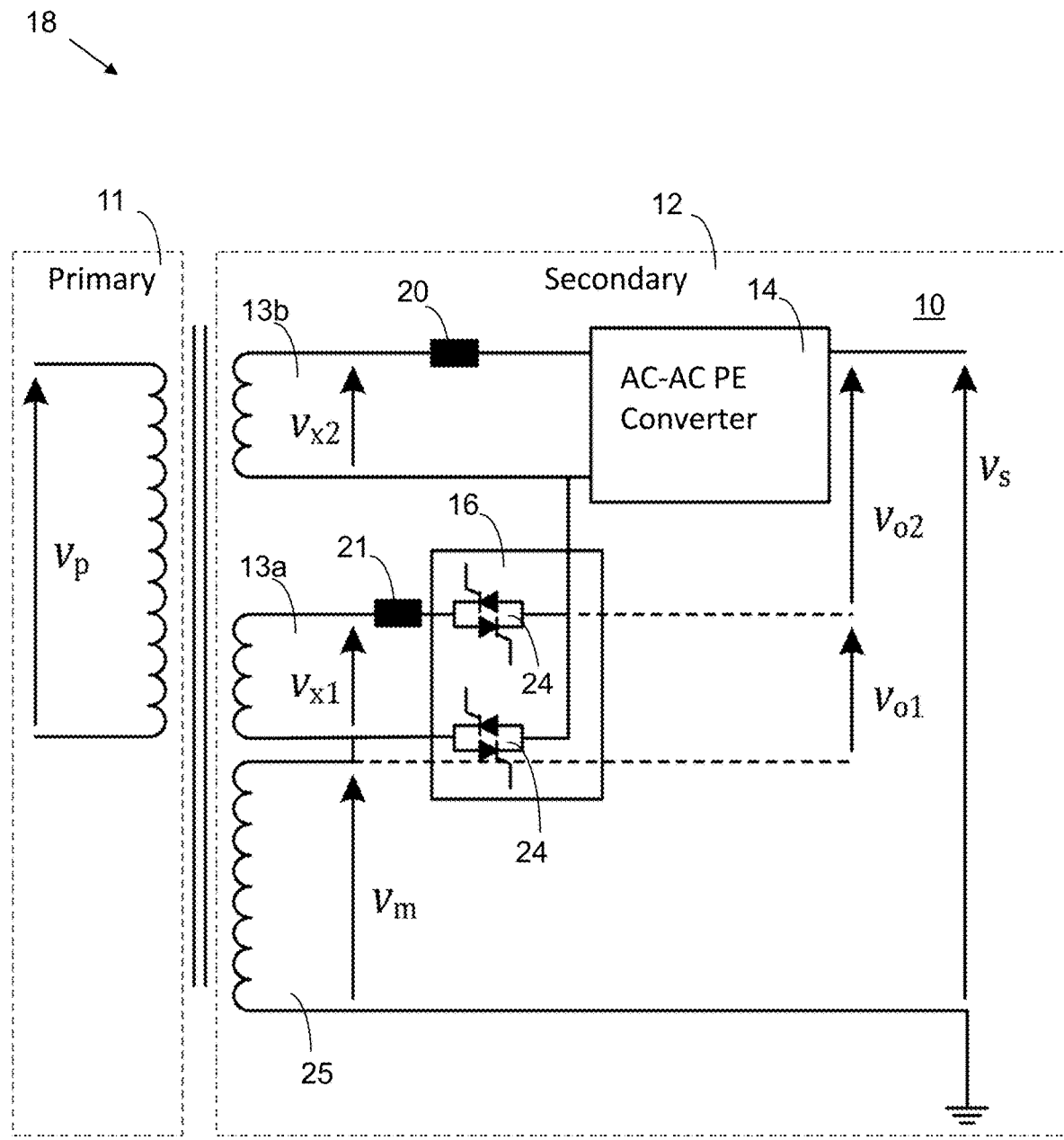
FIG. 3a is a schematic overview depicting an example of an AC-AC PE converter which is floating with respect to ground.
Figure 3B:
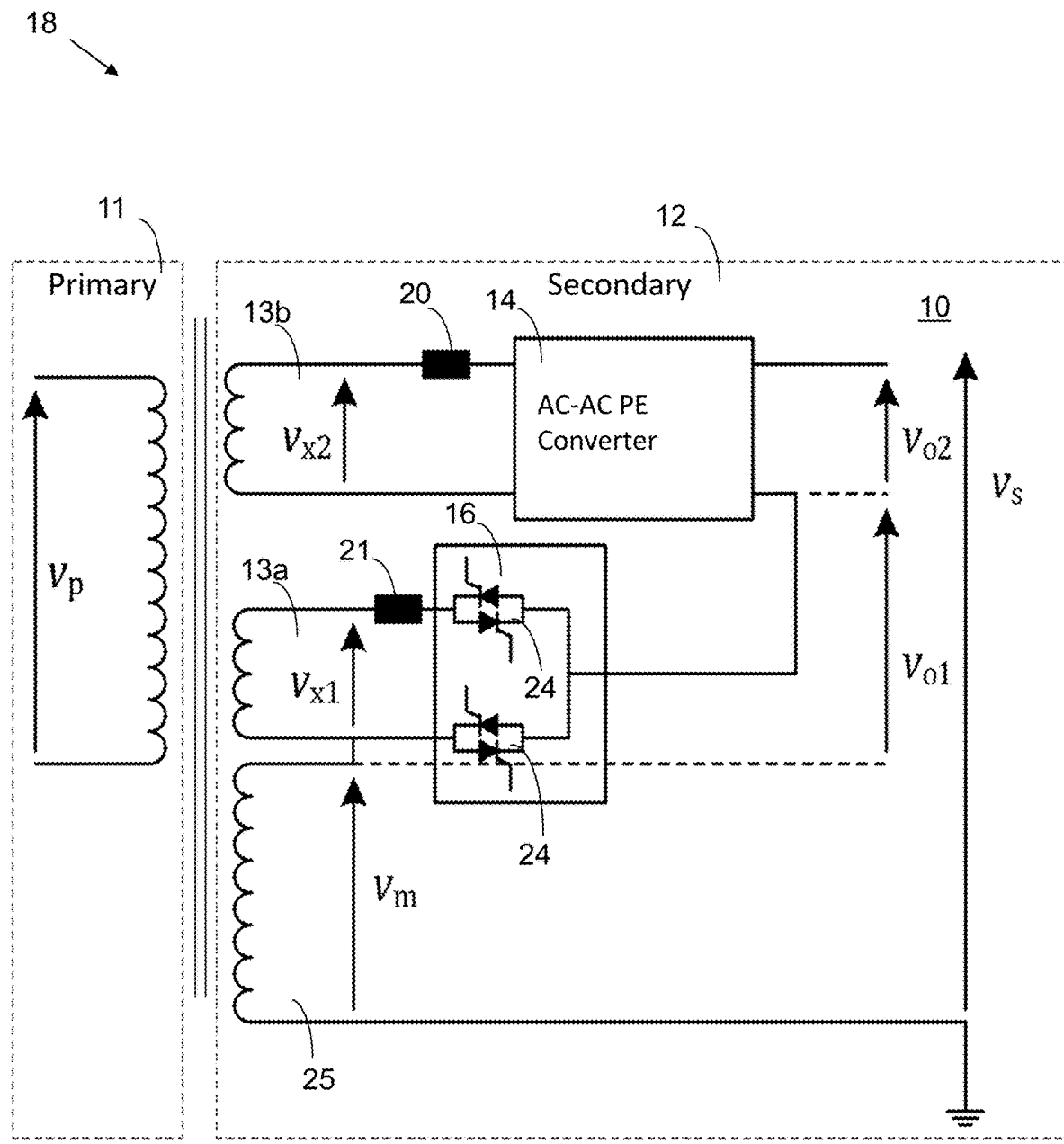
FIG. 3b is a schematic overview depicting another example of an AC-AC PE converter which is floating with respect to ground.
Figure 3C:
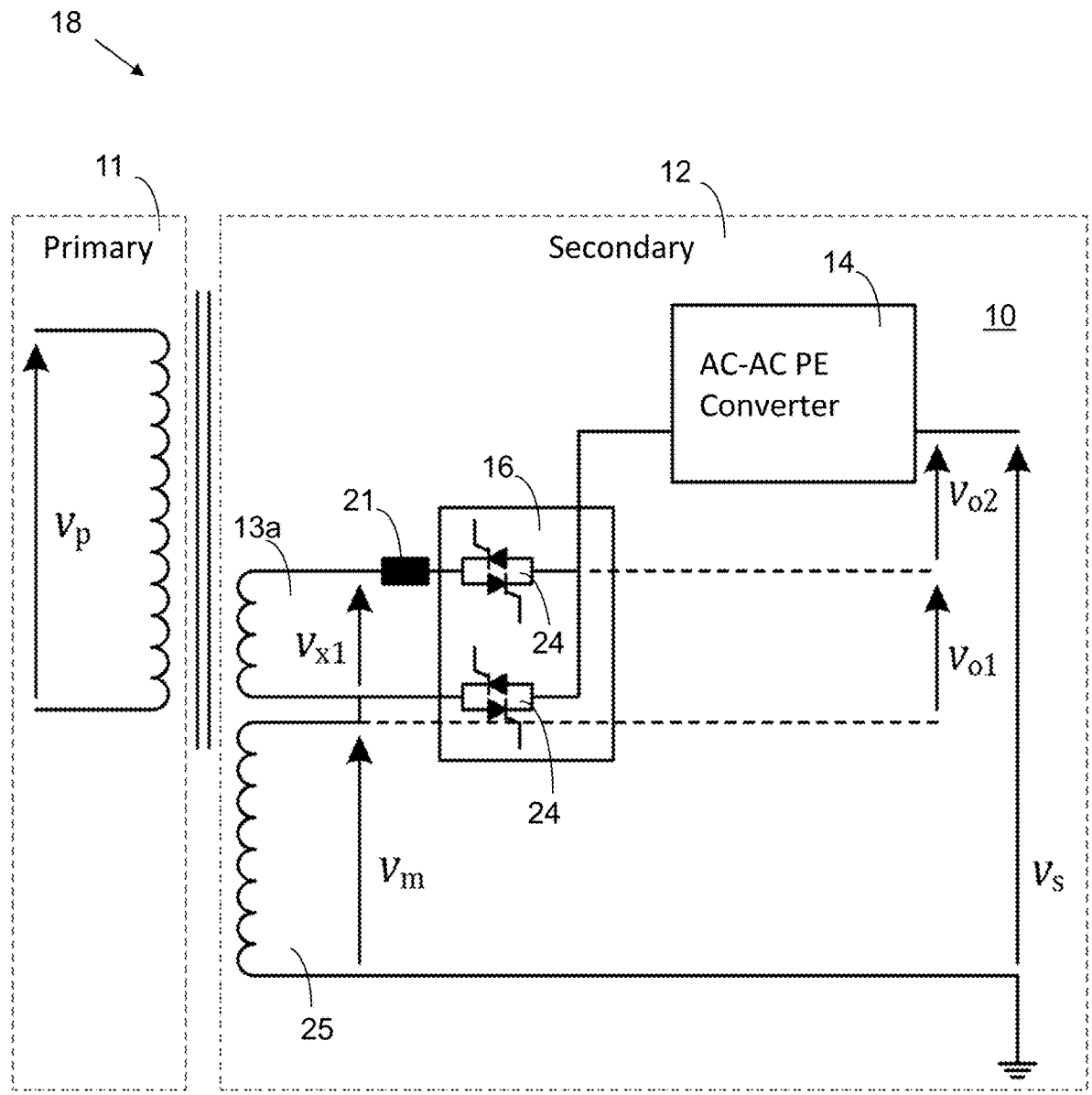
FIG. 3c is a schematic overview depicting another example of an AC-AC PE converter which is floating with respect to ground.

According to some embodiments the AC-AC PE converter 14 is connected to ground or close to ground. This is illustrated in FIGS. 2a, 2b and 2c where the AC-AC PE converter 14 is connected close to ground in order to minimize the required insulation voltage. However, according to some embodiments, it is possible to have the AC-AC PE converter 14 floating with respect to ground, which is illustrated in FIGS. 3a, 3b and 3c.

According to some embodiments the AC-AC PE converter 14 may be based on IGBTs. The AC-AC PE converter 14 may also be implemented with other semiconductor switches, e.g., Metal Oxide Semiconductor Field Effect Transistors (MOSFETs), Integrated Gate-Commutated Thyristors (IGCTs) or Bi-mode Insulated Gate Transistors (BIGTs). Moreover, each thyristor switch of the thyristor-based AC-AC PE converter 16 may be implemented either with two separate Phase-Controlled Thyristors (PCT) connected in anti-parallel or implemented with a single Bidirectionally Controlled Thyristor (BCT). The thyristor-based AC-AC PE converter 16 implemented with the single BCT integrates two thyristors in one single package and simplifies the mechanical design, compared to the implementation with anti-parallel PCTs.

Figure 4A:
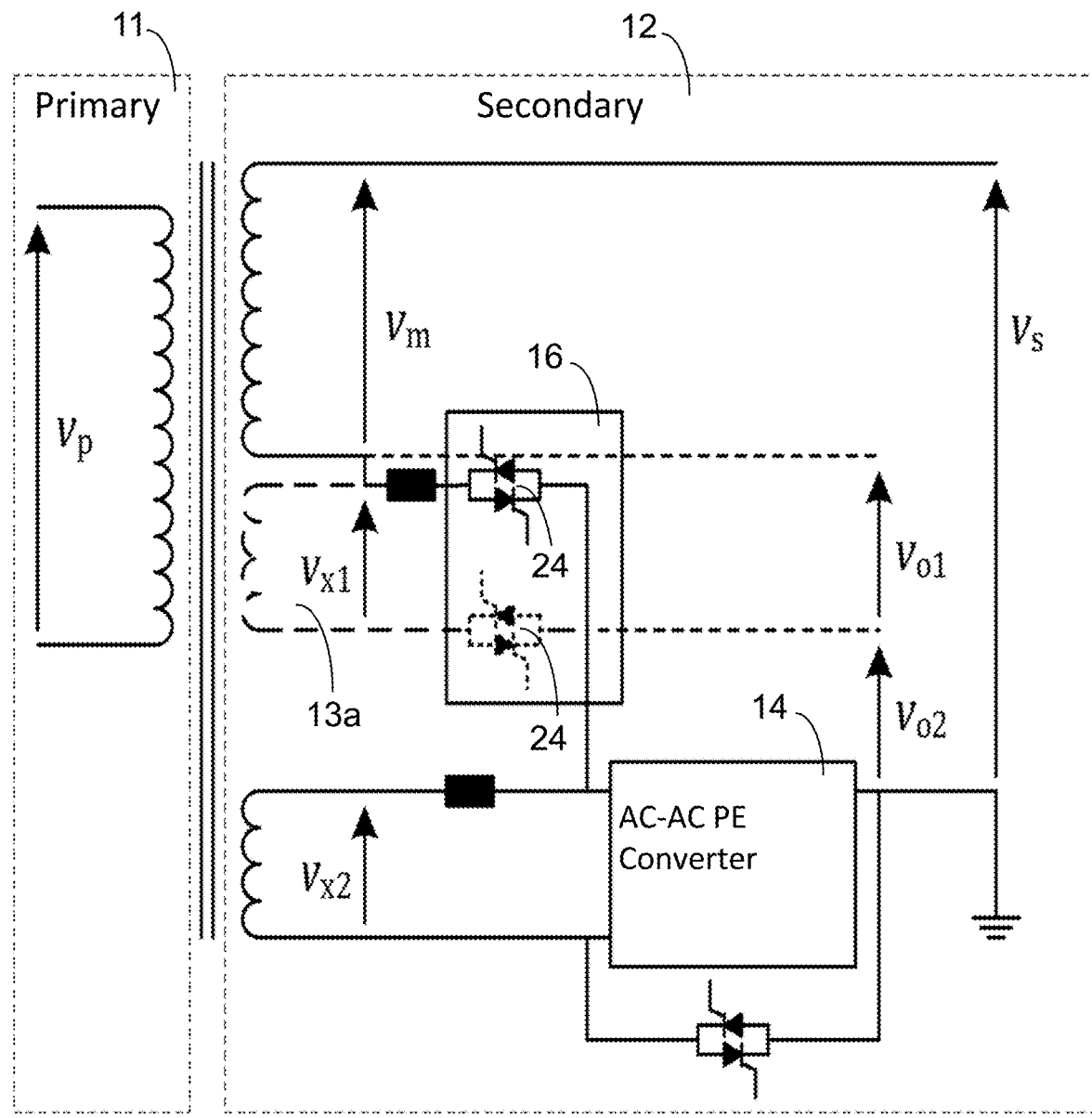
FIG. 4a is a schematic overview depicting an example of a switching state of a thyristor-based AC-AC PE converter.

The operating principle of the thyristor-based AC-AC PE converter 16 is very similar and will be explained for the circuit of FIG. 2a. The switching states of the thyristor-based AC-AC PE converter 16 of FIG. 2a are shown in FIG. 4a and FIG. 4b are briefly described as follows:

Switching state U, shown in FIG. 4a: The upper thyristor 24 of the thyristor-based AC-AC PE converter 16 is conducting. Thus, the thyristor-tapped winding 13a is bypassed and the voltage vo1, generated by the thyristor-based AC-AC PE converter 16, is at the minimum value of its regulation range. The AC-AC PE converter 14 adds or subtracts voltage vo2.

Figure 4B:
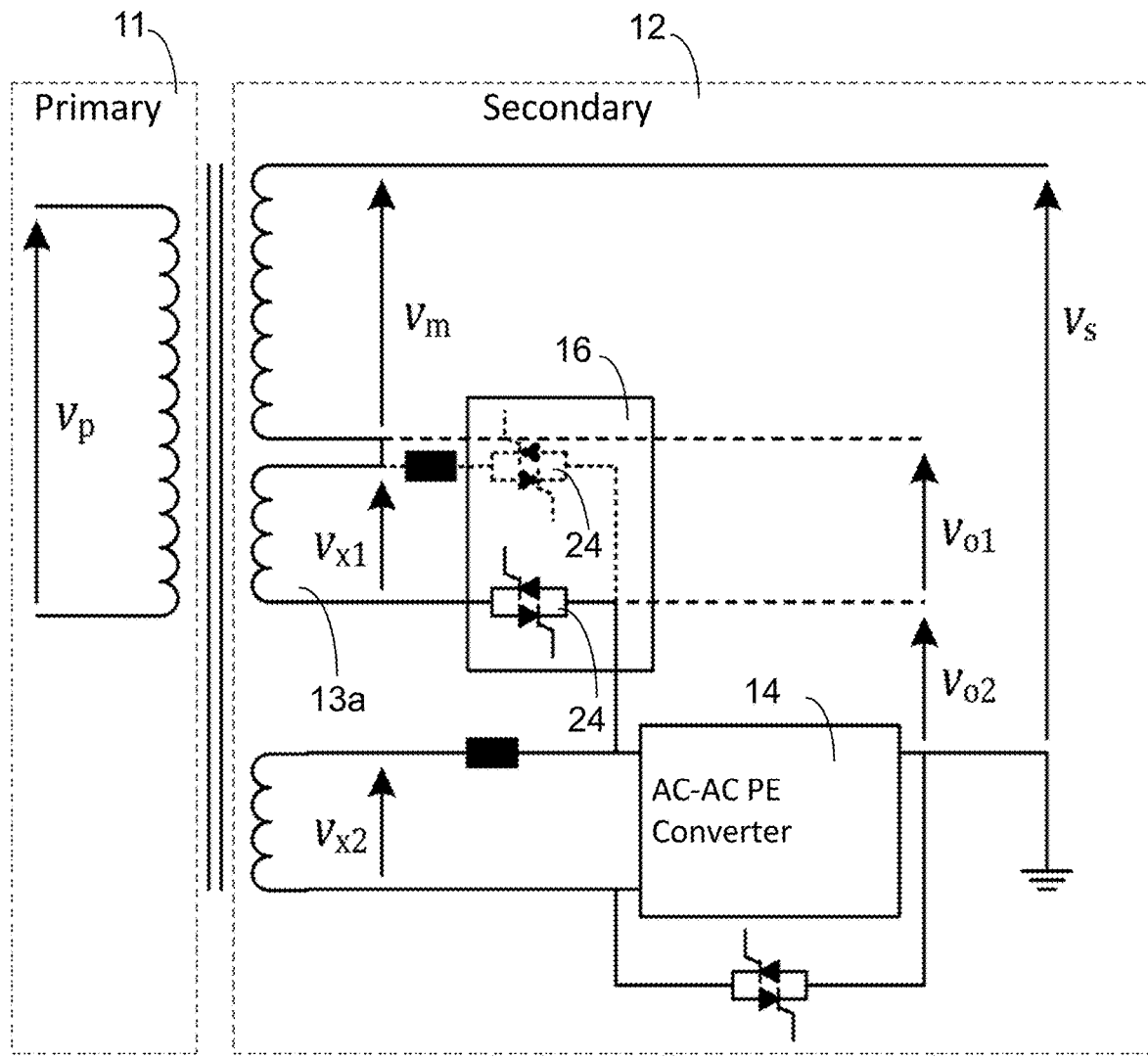
FIG. 4b is a schematic overview depicting another example of a switching state of a thyristor-based AC-AC PE converter.

Switching state L, shown in FIG. 4b: The lower thyristor 24 of the thyristor-based AC-AC PE converter 16 is conducting. Thus, the thyristor-tapped winding 13a is inserted and the voltage vo1, generated by the thyristor-based AC-AC PE converter 16, is at its maximum value of its regulation range. The AC-AC PE converter 14 adds or subtracts voltage vo2.

In other words, the thyristor-based AC-AC PE converter 16 offer a hybrid voltage regulation, which combines coarse voltage regulation by the thyristor-based AC-AC PE converter 16 and fine voltage regulation by the AC-AC PE converter 14. The coarse voltage regulation should be employed less frequently than the fine voltage regulation, which is in line with the characteristics of the thyristors 24 that are typically optimized for conduction and not fast and frequent switching operations.

The AC-AC PE converter 14 and the thyristor-based AC-AC PE converter 16 may be rated for providing any proportion of the regulation range $\pm\Delta V$. Yet, based on the operating principle illustrated in FIG. 4*a* and FIG. 4*b*, as well as based on a) vs=vm+vo1+vo2, and b) vs=vm+vo described earlier, the following observations can be made:

If the AC-AC PE converter 14 is rated for providing a smaller fraction of $+\Delta V$ than the thyristor-based AC-AC PE converter 16, the voltage regulation will not be stepless. This is because the maximum voltage vo1+vo2 of switching state U, which is equal to the maximum vo2 (vo1 is equal to the voltage drop of the thyristor 24 and the impedance 21, which are assumed to be close to zero), is lower than the minimum voltage vo1+vo2 of switching state U, which is equal to the maximum vo1 plus the minimum vo2.

If the AC-AC PE converter 14 is rated for providing a larger fraction of $+\Delta V$ than the thyristor-based AC-AC PE converter 16, the voltage regulation will be stepless, but the cost of the AC-AC PE converter 14 will not be minimized.

Based on the above-mentioned observations, stepless voltage regulation with minimum PE converter cost can be achieved if each type of converter is rated for providing half of $+\Delta V$. In this way, the voltage regulation can be realized by employing the following manner:

Regulation $\Delta$-V-0: The thyristor-based AC-AC PE converter 16 is in switching state U and the AC-AC PE converter 14 is regulating within its full range of $+\Delta V/2$. Note that the switching state U corresponds to voltage regulation of $-\Delta V/2$ for the thyristor-based AC-AC PE converter 16.

Regulation 0-$\Delta$V: The thyristor-based AC-AC PE converter 16 is in switching state L and the AC-AC PE converter 14 is regulating within its full range of $+\Delta V/2$. Note that the switching state L corresponds to voltage regulation of $+\Delta V/2$ for the thyristor-based AC-AC PE converter 16.

Figure 5:
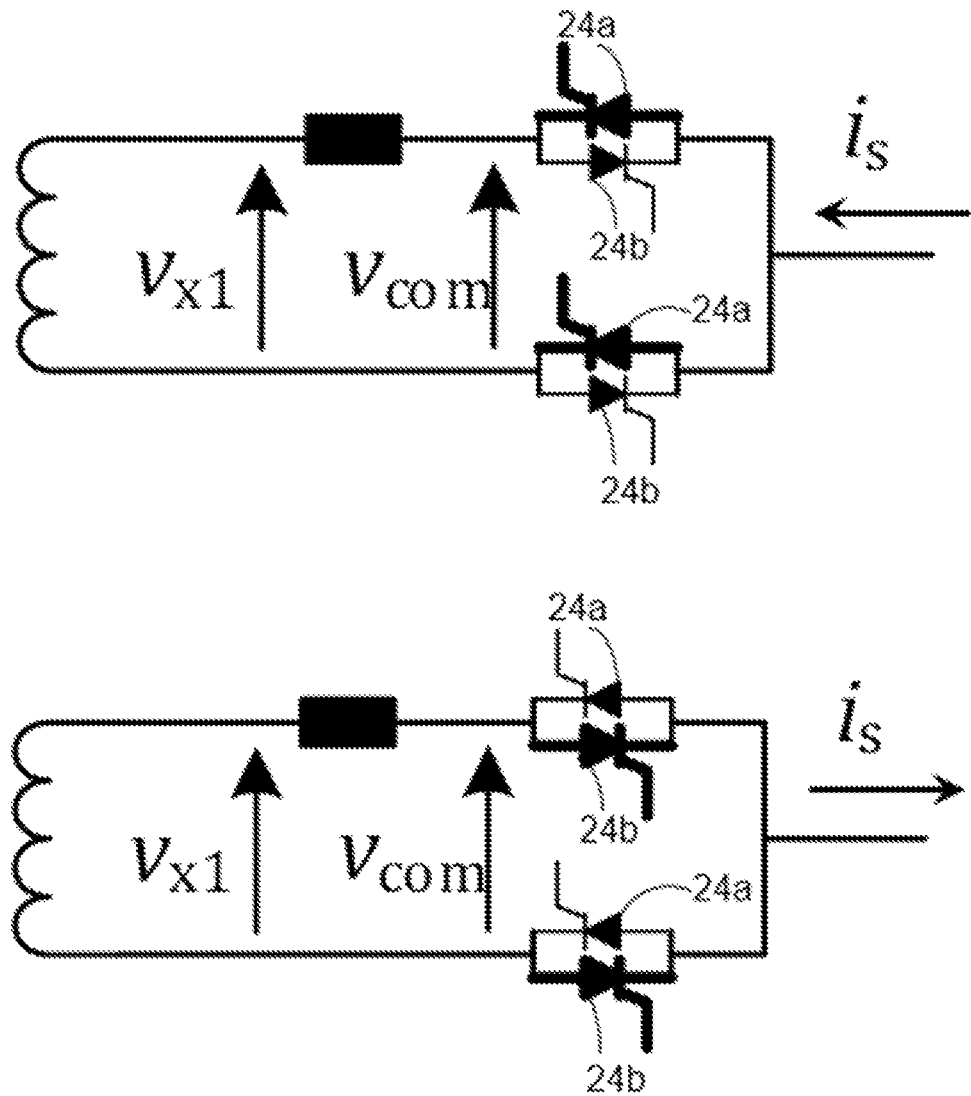
FIG. 5 is a schematic overview illustrating commutation of thyristors.

The commutation of the thyristors 24 may be based on the principle illustrated in FIG. 5. The thyristors 24 are in FIG. 5 shown as 24*a* and 24*b*. For commutating the current is between upper and lower thyristors 24*a* and 24*b*, the thyristors 24*a*, shown in bold, may be pulsed, while no gate pulse should be sent to the thyristors 24*b*. The thyristors that need to be triggered depend on the current direction and the successful commutation depends on the polarity of the commutating voltage (vcom) and the timing of the gate pulses.

FIG. 5 shows in the thyristors 24*a* that need to be pulsed for different current directions. More specifically, the current commutation between upper and lower thyristor switches should be performed by pulsing the thyristors 24*a*, while no gate pulse should be sent to the thyristors 24*b*. By triggering the thyristors 24*a*, the current can be transferred from one thyristor to the other (depending on the polarity of the commutation voltage vcom), without causing a short circuit current to flow between the terminals of the thyristor-tapped winding 13*a*, as this current is blocked by one of the two thyristors 24*a*. The current commutation can be performed in the following manner:

For commutation from the upper to the lower thyristor switch: the commutating voltage vcom should have polarity that reverse-biases the upper and forward-biases the lower thyristor, respectively.

For commutation from the lower to the upper thyristor switch: the commutating voltage vcom should have polarity that reverse-biases the lower and forward-biases the upper thyristor, respectively.

If the polarity of the commutating voltage vcom is not suitable, a short-term short circuit, e.g., in the range of some milliseconds, can be allowed, since that the impedance 21, e.g., short-circuit limiting reactance, is dimensioned for protecting the thyristor-tapped winding 13*a* against short-circuit faults of the thyristor-based AC-AC PE converter 16.

Figure 6A:
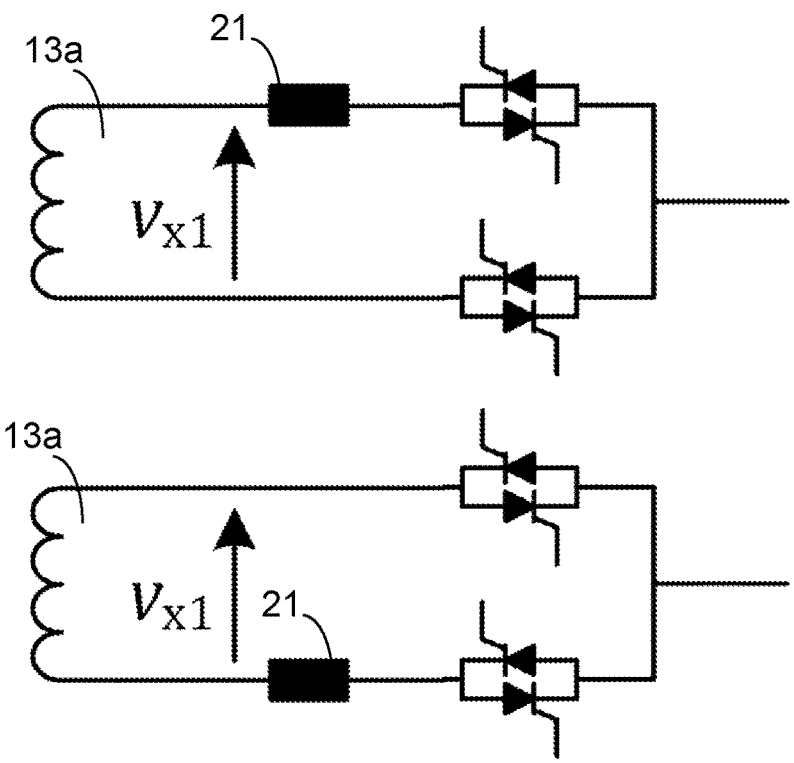
FIG. 6a is a schematic overview illustrating implementation with single impedance of a thyristor-tapped winding.
Figure 6B:
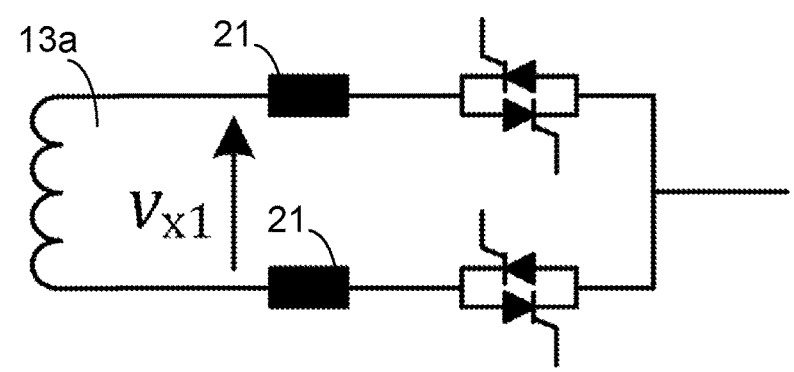
FIG. 6b is a schematic overview illustrating implementation with two impedances of a thyristor-tapped winding.
Figure 6C:
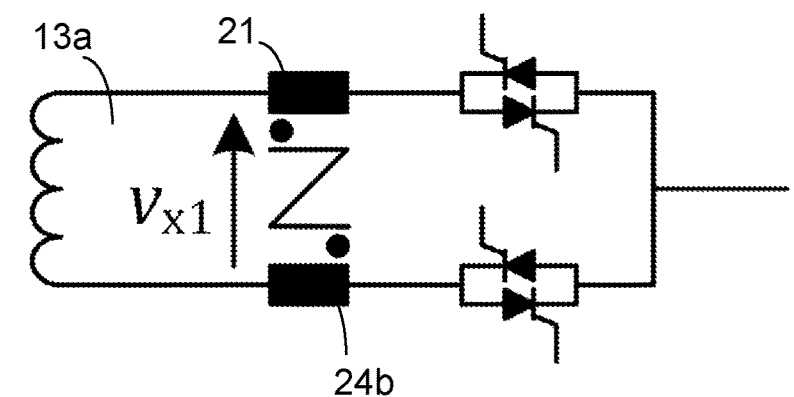
FIG. 6c is a schematic overview illustrating implementation with coupled impedance of a thyristor-tapped winding.

The protection of the thyristor-based AC-AC PE converter 16 and the corresponding thyristor-tapped winding 13*a* is an important feature of the thyristor-based AC-AC PE converter 16. FIGS. 6*a*, 6*b* and 6*c* illustrates different ways of introducing the impedance 21, e.g., the short-circuit limiting reactance, which is employed for various purposes, namely: 1) to protect the thyristor-tapped winding 13*a* from short-circuit faults of the thyristor-based AC-AC PE converter 16 and 2) for limiting the rate-of-change of current (di/dt) of the thyristor that is being turned on. Typically, the impedance 21, e.g., reactance for limiting the di/dt of the thyristors is relatively small, thus, the size of the short-circuit limiting reactance is defined by the short-circuit withstand capability of the thyristor-tapped winding 13*a*. This impedance 21 may be introduced in the circuit of the thyristor-based AC-AC PE converter 16 as a single unit, connected either at the top or bottom terminal of the thyristor-tapped winding 13*a*, as shown in FIG. 6*a*. Alternatively, the impedance 21 may be split in two parts, each of which is connected to the top and bottom terminals of the thyristor-tapped winding 13*a*, so that the circuit of the thyristor-based AC-AC PE converter 16 is symmetrical, as illustrated in FIG. 6*b*. Finally, a special type of coupled impedance 21 may be employed, as shown in FIG. 6*c*. This coupled impedance may be designed in such a way that it fulfils the following requirements:

The flux of the coupled windings is added when current flows from the top to the bottom terminal of the thyristor-tapped winding 13*a* and vice versa. Thus, the inductance of the coupled impedance 21 would be high for this current direction, which occurs during a short-circuit fault of the thyristor-based AC-AC PE converter 16.

The flux of the coupled windings is subtracted when current flows from the top and the bottom terminal of the thyristor-tapped winding 13*a* to the common terminal of the thyristors and vice versa. Thus, the inductance of the coupled impedance 21 would be low for this current direction, which occurs during the commutation of the current between the upper and lower thyristor switches.

Figure 7A:
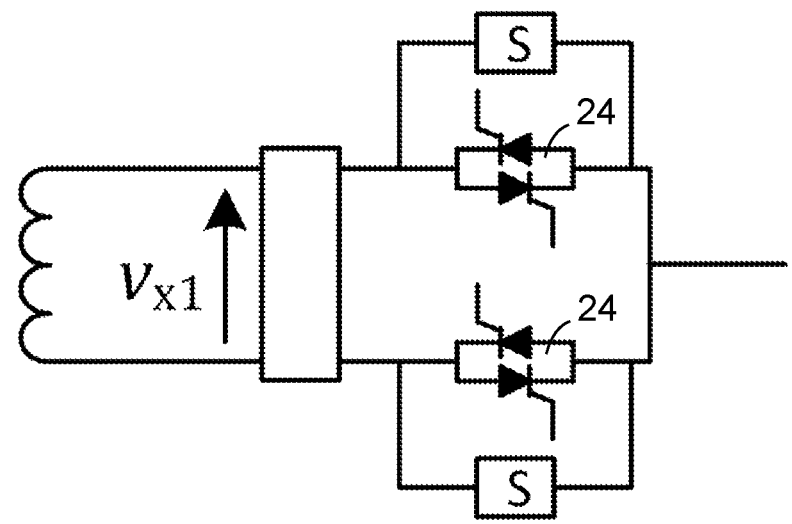
FIG. 7a is a schematic overview illustrating a variation of snubber networks.
Figure 7A:
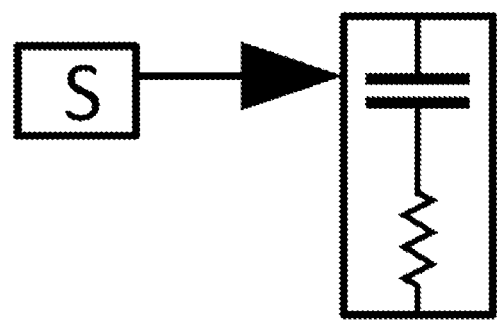
Figure 7B:
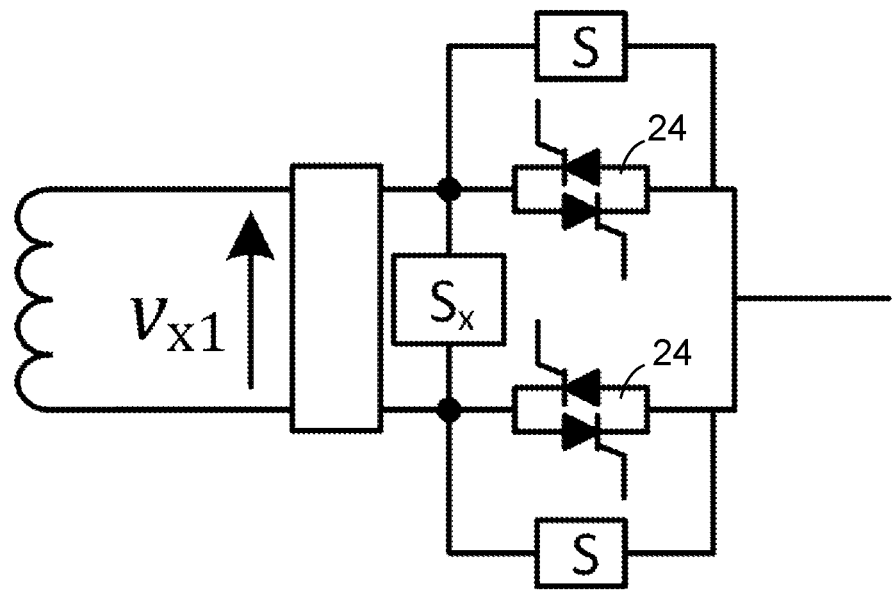
FIG. 7b is a schematic overview illustrating another variation of snubber networks.
Figure 7B:
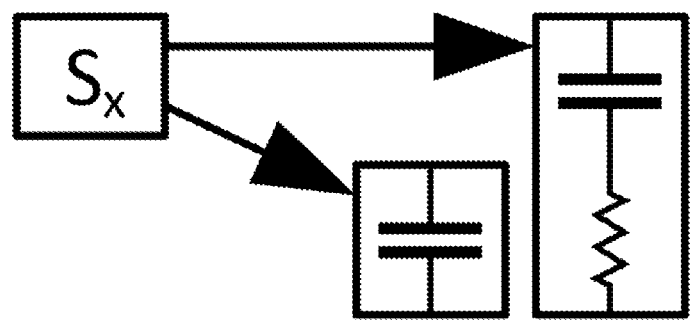

Moreover, for the implementation of the thyristor-based AC-AC PE converter 16, additional passive components may be required for protecting the thyristors 24 from high rate-of-change of voltage (dv/dt) after a turn-off. FIG. 7*a* and FIG. 7*b* shows two variations of snubber networks that would limit the dv/dt of the turned-off thyristor. More specifically:

FIG. 7*a* shows only RC snubber networks, branches denoted by symbol S, dedicated to each thyristor 24, e.g., thyristor switch. I.e., an RC snubber may be connected in parallel to each thyristor 24.

FIG. 7b shows a combination of a common capacitor (C) or RC network, branch denoted by symbol Sx, with RC snubbers, branches denoted by symbol S, connected in parallel to each thyristor 24.

Thus, according to some embodiments the RC snubber network S may be connected in parallel to each thyristor 24, wherein the RC snubber network S comprises a resistor and a capacitor connected in series and/or in parallel. And, according to some embodiments, a further RC snubber network Sx is a common snubber network for all thyristors 24 which is connected in parallel to the thyristors 24, wherein the RC snubber network Sx comprises a resistor and a capacitor connected in series and/or in parallel, or a capacitor. Sx may be defined as a common snubber for both thyristors and may be connected in parallel to both thyristors, i.e., a thyristor bridge, and not to each thyristor separately. Each resistor and capacitor may be constructed by series and parallel connections of multiple smaller resistors and capacitors, i.e., the resistor may be a single resistor or several smaller resistors connected in series and/or parallel and the capacitor may be a single capacitor or several smaller capacitors connected in series and/or parallel.

The main difference between the variations of FIG. 7a and FIG. 7b is that the dv/dt limitation of the thyristors 24 defines directly the capacitance of the S branches for the former, but defines the effective capacitance of the Sx and S branches for the latter.

Thus, the variation of FIG. 7b allows for some freedom in designing the S branches, e.g., the bulk capacitance required for not exceeding the dv/dt limitation could be installed in the common Sx branch and smaller capacitances can be installed in the S branches. The Sx branch may be implemented in the following ways:

Single capacitor;
Parallel-connected capacitors;
Series-connected capacitors;
Matrix of series-parallel-connected capacitors;
All the above combined with a resistor, or a matrix of resistors, connected in series either to each single capacitor or to any combination of capacitors (series, parallel, or both). The introduced resistor(s) are useful for damping resonances between the capacitor(s) and inductive elements of the circuit.

The S branches can be implemented as mentioned in the last point above. Finally, special surge arresters, e.g., varistors, which are not illustrated in FIG. 7a or FIG. 7b, may be connected in parallel to the S and Sx branches in order to protect these branches and the thyristors 24 from overvoltage transients.

Figure 8:
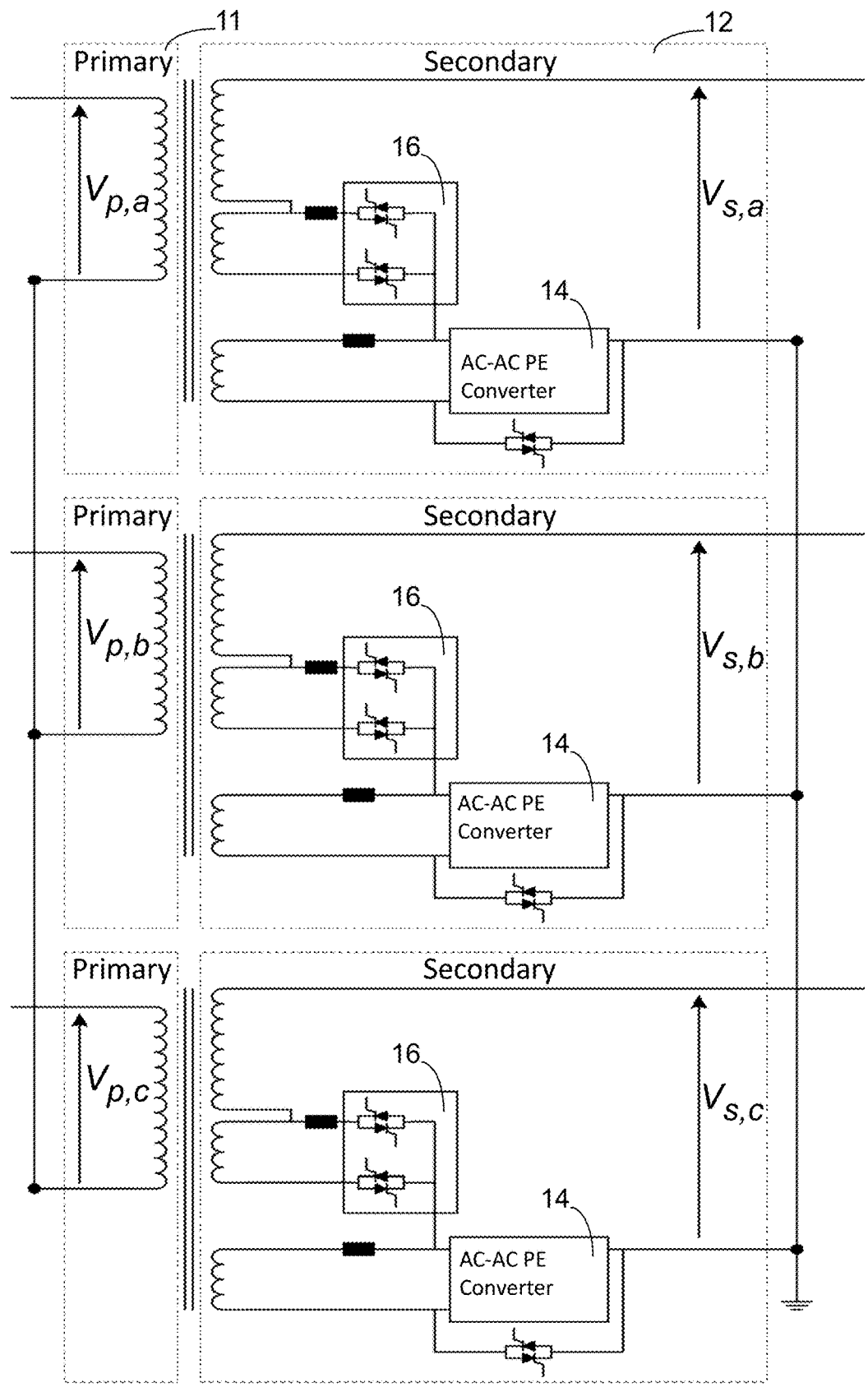
FIG. 8 is a schematic overview of a 3-phase Y-Y connection.

FIGS. 2a-c and FIGS. 3a-c illustrate single-phase circuits of the thyristor-based AC-AC PE converter 16. However, the thyristor-based AC-AC PE converter 16 of FIGS. 2a-c and FIGS. 3a-c may be connected in a three-phase wye (Y) or delta (D) configuration in the secondary side 12, while the primary side 11 may be connected in either a Y or D configuration. Thus, the possible three-phase configurations of the primary-secondary can be Y-Y, D-Y, Y-D, Delta-Y, D-D. FIG. 8 illustrates an example of a three-phase Y-Y connection.

Accordingly, in terms of integration of the transformer 10 with the AC-AC PE converter 14 and the thyristor-based AC-AC PE converter 16, the following options are thus possible:

Fully integrated: According to some embodiments the transformer arrangement 18 may further comprise a transformer tank, and wherein the AC-AC PE converter 14, the thyristor-based AC-AC PE converter 16 and the impedances 20, 21 are installed inside the transformer tank.

Partly integrated: According to some embodiments the transformer arrangement 18 further comprises the transformer tank and a separate container, wherein the impedances 20, 21 are installed inside the transformer tank and wherein the AC-AC PE converter 14 and the thyristor-based AC-AC PE converter 16 are installed in the separate container.

Decoupled: According to some embodiments the transformer arrangement 18 further comprises the separate container, wherein the impedances 20, 21, the AC-AC PE converter 14 and the thyristor-based AC-AC PE converter 16 are installed in the separate container.

Embodiments herein provide the following benefits and advantages:

Replacement of the stepped regulation with the conventional OLTC by stepless regulation.
Simplification of the transformer design requirements by reducing the number of taps compared to the conventional VRT.
Possibility to reduce the manufacturing cost of the transformer, due to reduced number of windings and taps, and due to less complex mechanical design.
Possibility to extend the functionalities to the transformer (e.g., flicker mitigation, harmonics compensation);
Lower losses for the PE converters compared with the prior-art, due to the very low losses of the thyristors.
Lower cost for the PE converters compared with the prior-art, due to the lower cost of thyristors.

It is to be noted that any feature of any of the aspects may be applied to any other aspect, wherever appropriate. Likewise, any advantage of any of the aspects may apply to any of the other aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

It will be appreciated that the foregoing description and the accompanying drawings represent non-limiting examples of the method and winding arrangement taught herein. As such, the winding arrangement and techniques taught herein are not limited by the foregoing description and accompanying drawings. Instead, the embodiments herein are limited only by the following claims and their legal equivalents.

The invention claimed is:

1. A transformer arrangement comprising:
a transformer having a primary side for receiving input voltage and current from a source and a secondary side for providing output voltage and current to a load;
an AC-AC Power Electronic (PE) converter connected to a thyristor used for bypassing the AC-AC PE converter in case of a short-circuit fault in a terminal of the primary side and/or the secondary side;

wherein the transformer arrangement further comprises a thyristor-based AC-AC PE converter connected to a thyristor-tapped winding and wherein the AC-AC PE converter is connected with the thyristor-tapped winding via the thyristor-based AC-AC PE converter, and wherein the thyristor-based AC-AC PE converter is connected to an impedance to protect the thyristor-tapped winding from short-circuit faults of the thyristor-based AC-AC PE converter, wherein the thyristor-based AC-AC PE converter comprises one or more parallel connected and/or series connected thyristors, and wherein the impedance is a coupled impedance, wherein the coupled impedance is associated to high impedance when a magnetic flux is added when current flows from a top to a bottom terminal of the thyristor-tapped winding and vice versa, and associated to low impedance when the magnetic flux of coupled windings is subtracted when current flows from the top and the bottom terminal of the thyristor-tapped winding to a common terminal of the thyristors and vice versa.

2. The transformer arrangement according to claim 1, wherein the AC-AC PE converter is connected in series with the thyristor-tapped winding.

3. The transformer arrangement according to claim 1, wherein the AC-AC PE converter is connected to an auxiliary winding.

4. The transformer arrangement according to claim 3, wherein the AC-AC PE converter is connected to an impedance to protect the auxiliary winding from a short-circuit fault of the AC-AC PE converter.

5. The transformer arrangement according to claim 3, wherein the auxiliary winding is tapped.

6. The transformer arrangement according to claim 3, wherein the auxiliary winding is separate.

7. The transformer arrangement according to claim 3, wherein the transformer arrangement further comprises a transformer tank, and wherein the AC-AC PE converter, the thyristor-based AC-AC PE converter, and the impedances are installed inside the transformer tank.

8. The transformer arrangement according to claim 3, wherein the transformer arrangement further comprises a transformer tank and a separate container, wherein the impedances are installed inside the transformer tank and wherein the AC-AC PE converter and the thyristor-based AC-AC PE converter are installed in the separate container.

9. The transformer arrangement according to claim 3, wherein the transformer arrangement further comprises a separate container, wherein the impedances, the AC-AC PE converter, and the thyristor-based AC-AC PE converter are installed in the separate container.

10. The transformer arrangement according to claim 1, wherein the impedance is split in two parts, each of which is connected to top and bottom terminals of the thyristor-tapped winding.

11. The transformer arrangement according to claim 1, wherein an RC snubber network is connected in parallel to each thyristor, wherein the RC snubber network comprises a resistor and a capacitor connected in series and/or in parallel.

12. The transformer arrangement according to claim 11, wherein a further RC snubber network is a common snubber network for all thyristors which is connected in parallel to the thyristors, wherein the RC snubber network comprises a resistor and a capacitor connected in series and/or in parallel, or a capacitor.

* * * * *